(12) United States Patent
Normark et al.

(10) Patent No.: US 7,864,109 B2
(45) Date of Patent: Jan. 4, 2011

(54) METHOD AND SPREAD SPECTRUM SOFTWARE RECEIVER FOR SATELLITE NAVIGATION

(75) Inventors: Per-Ludvig Normark, Stockholm (SE); Alexander Michael Mitelman, Stockholm (SE)

(73) Assignee: NordNav Technologies AB, Lulea (SE)

( * ) Notice: Subject to any disclaimer, the term of this patent is extended or adjusted under 35 U.S.C. 154(b) by 261 days.

(21) Appl. No.: 12/095,421

(22) PCT Filed: Nov. 29, 2005

(86) PCT No.: PCT/SE2005/001793
§ 371 (c)(1),
(2), (4) Date: May 29, 2008

(87) PCT Pub. No.: WO2007/064250
PCT Pub. Date: Jun. 7, 2007

(65) Prior Publication Data
US 2008/0291979 A1 Nov. 27, 2008

(51) Int. Cl.
*G01S 19/34* (2010.01)
(52) U.S. Cl. .................................. 342/357.74
(58) Field of Classification Search ............. 342/357.74
See application file for complete search history.

(56) References Cited

U.S. PATENT DOCUMENTS

| 4,928,107 | A | * | 5/1990 | Kuroda et al. | 342/357.15 |
|---|---|---|---|---|---|
| 5,323,163 | A | * | 6/1994 | Maki | 342/357.15 |
| 5,936,572 | A | * | 8/1999 | Loomis et al. | 342/357.07 |
| 6,710,578 | B1 | | 3/2004 | Sklovsky | |
| 6,720,915 | B2 | * | 4/2004 | Sheynblat | 342/357.05 |
| 6,727,850 | B2 | | 4/2004 | Park et al. | |
| 2001/0048387 | A1 | | 12/2001 | Sheynblat | |
| 2005/0140545 | A1 | | 6/2005 | Subbaro et al. | |
| 2006/0250304 | A1 | * | 11/2006 | Mo et al. | 342/357.15 |

FOREIGN PATENT DOCUMENTS

EP  1186905 A2  3/2002

OTHER PUBLICATIONS

International Search Report.
International Preliminary Report on Patentability.

* cited by examiner

*Primary Examiner*—Gregory C Issing
(74) *Attorney, Agent, or Firm*—Moore & Van Allen PLLC; W. Kevin Ransom

(57) ABSTRACT

A spread spectrum signal receiver includes a radio signal processing unit, which is at least partly implemented in software running on a processor. The processing unit is adapted to estimate a respective processing demand required to produce position/time related data based on each subset of a number of candidate subsets of signal sources among a group of potential signal sources. Each candidate subset contains at least a minimum number of signal sources, which is necessary to produce the position/time related data of a desired quality. The processing unit is adapted to select a set of preferred signal sources from the group of potential signal sources based on a candidate subset, which is associated with a lowest estimated processing demand during a subsequent receiver operating period. Then, the receiver receives spread spectrum signals from the selected set of signal sources, and based on the received signals produces position/time related data.

18 Claims, 2 Drawing Sheets

METHOD AND SPREAD SPECTRUM SOFTWARE RECEIVER FOR SATELLITE NAVIGATION

THE BACKGROUND OF THE INVENTION AND PRIOR ART

The present invention relates generally to reception and processing of spread spectrum signals. More particularly the invention relates to a spread spectrum receiver according to the preamble of claim 1 and a method according to the preamble of claim 9. The invention also relates to a computer program product according to claim 17 and a computer readable medium according to claim 18.

Spread spectrum transmission solutions are becoming increasingly important, for instance in global navigation satellite systems (GNSS). Presently, the Global Positioning System (GPS; U.S. Government) is the dominant system, however alternative systems are expected to gain increased importance in the future. So far, the Global Orbiting Navigation Satellite System (GLONASS; Russian Federation Ministry of Defense) and the Galileo system (the European programme for global navigation services) constitute the major alternative GNSSs. Various systems also exist for enhancing the coverage, the availability and/or the quality of at least one GNSS in a specific region. The Quasi-Zenith Satellite System (QZSS; Advanced Space Business Corporation in Japan), the Wide Area Augmentation System (WAAS; The U.S. Federal Aviation Administration and the Department of Transportation) and European Geostationary Navigation Overlay Service (EGNOS; a joint project of the European Space Agency, the European Commission and Eurocontrol—the European Organisation for the Safety of Air Navigation) represent examples of such augmentation systems for GPS, and in the latter case GPS and GLONASS.

Unfortunately, the dissimilarities in the frequency bands, and especially the signal formats used in the different systems, result in the situation that a signal receiver adapted for one system is generally not able to receive and process signals from sources belonging to a different system. Thus, multiple receiver chains, or one receiver chain with plural signal paths, are required to enable reception of signals from more than one type of system. Including more than one receiver chain in a single device renders the device expensive, bulky and/or heavy. Therefore, a programmable software receiver solution is desired, which enables processing of many signal formats in one processor, e.g. a CPU (central processing unit) or a DSP (digital signal processor). Namely, in such a design, it is possible to adapt the signal processing principles to a plurality of signal formats. A software-based GNSS receiver is also advantageous in that this kind of receiver may co-exist efficiently with other types of signal receivers, signal processing devices and/or software applications, for example in a laptop computer, a mobile telephone or a PDA (Personal Digital Assistant).

However, software receiver implementations are associated with one important drawback in comparison with corresponding hardware designs. Namely, a software implementation running on a generic microprocessor is typically less energy efficient (in terms of energy or power per output data) than one running on a dedicated hardware implementation, e.g. represented by an ASIC (Application Specific Integrated Circuit).

For reasons mentioned above, it is advantageous to integrate a software-based receiver into a portable/handheld device, provided such integration addresses the additional challenge of these devices' typically limited battery capacity. Thus, it is important to optimize the use of the power resources as well. With these things in mind, we will now briefly discuss the prior art in this area.

U.S. Pat. No. 6,710,578 discloses a method for power resource management in a hardware-based portable communication device, such as a radiotelephone. The device may be operated in a plurality of operational modes, and before entry into a particular user-selected mode, an estimate of the available power is calculated. It is then predicted whether these resources are sufficient for the selected mode, and if it is estimated that the resources are insufficient, the operation of the device is restricted with respect to at least one operational mode. However, the selection of the signal sources being used is not influenced by these measurements. Furthermore, the solution is entirely focused on a hardware implementation.

U.S. Pat. No. 6,727,850 describes a method and an apparatus for selecting optimal satellites to locate an object. A satellite list including the coordinates of the visible satellites is generated. Then, the satellites having the highest redundancy are eliminated from the list, such that an intended number of satellites remain on the list. Thereby, a required computation volume to produce the list becomes relatively low. Here, the redundancy is defined by a degree of overlap that a satellite has with other satellites on the list. However, besides this redundancy measure, no quality-related parameter influences the choice of satellites used by the receiver. Furthermore, the design presumes a hardware implementation.

The published U.S. patent application 2005/0140545 reveals a GPS receiver having a software-implemented correlator, which is adapted to render possible seamless integration of multiple technologies without any compromise in performance levels and without the need for customized hardware. Allegedly, the design also reduces the power consumption as a result of fewer hardware components and the ability to change the sampling frequency. Nevertheless, optimization of power resources is not used in any way in the space vehicle (SV) selection algorithm.

SUMMARY OF THE INVENTION

The object of the present invention is therefore to alleviate the above problems and to provide a highly power-efficient software-based solution for receiving and processing spread spectrum signals.

According to the invention, the object is achieved by the receiver as initially described, wherein the processing unit is adapted to estimate a respective processing demand required to produce the position/time related data based on each subset of a number of candidate subsets of signal sources among the group of potential signal sources. Here, each candidate subset contains at least a minimum number of signal sources necessary to produce the position/time related data of a desired quality. The processing unit is also adapted to select a set of preferred signal sources based on a candidate subset, which is associated with a lowest estimated processing demand during a subsequent operating period for the receiver.

One important advantage of this design is that the receiver's energy consumption can be made very low while maintaining a specified quality of the position/time related data. Moreover, it is possible to configure the receiver such that if additional processing capacity becomes available, the processing demand may be allowed to increase by a certain amount; this improves the quality of the position/time related data. Naturally, the candidate subsets need not include all theoretically possible constellations of the potential signal sources. For example, subsets that prima facie represent highly unfavorable, or even non-working combinations, may be discarded directly.

According to one preferred embodiment of the invention, it is presumed that at least two of the signal sources in the group of potential signal sources emit signals of mutually different signal formats. Therefore, the processing unit is adapted to estimate the processing demand by considering a respective computational complexity for processing signals of each of said signal formats. Thus, a typical computational intensity necessary to process the signals of each format (e.g. GPS and Galileo respectively) may be weighed into the processing-demand estimation.

According to another preferred embodiment of the invention, the processing unit is adapted to estimate the processing demand by estimating a respective signal quality of each signal in the group of potential signal sources. Here, the signal quality is reflected by one or more of: a signal power parameter estimation, a noise density parameter estimation, a pseudorange error parameter estimation, a parameter indicating detected interference and signal source health/status data specifying whether or not a specific signal source is presently available for use. The signal power parameter estimation and the noise density parameter estimation may, in turn, be used to compute a signal-to-noise ratio estimation. The pseudorange error parameter estimation, in turn, may include a multipath distortion parameter estimation, a parameter indicating estimated atmospheric delays (ionospheric and/or tropospheric) and/or a parameter indicating satellite-based signal distortions (i.e. signal non-idealities originating from the satellite). Any detected interference detection may be broken up into narrowband interference, wideband interference, jamming and/or spoofing. The results of these tests and estimates are combined to yield a determination of the feasibility, and an estimate of the processing intensity required to acquire or track a particular signal. Thus, a reliable basis is established for assessing the processing demand.

According to still another preferred embodiment of the invention, the processing unit is adapted to estimate the processing demand by considering at least one geometry parameter. This parameter, in turn, reflects a spatial position of each of the signal sources in the group of potential signal sources relative to a current position/time for the receiver. For example, the so-called dilution of precision (DOP) concept may be used to encapsulate these geometry parameters. These geometry parameters, combined with a measured or assumed set of errors for the individual ranging sources, produce an estimate of the accuracy of a position fix.

According to another preferred embodiment of the invention, the processing unit is adapted to estimate the processing demand by considering whether a future operational mode of the receiver during the subsequent operating period is expected to be identical to a current operational mode of the receiver. If a different mode is expected, in which for example a different amount of processing capacity is available, the processing unit is adapted to estimate a respective processing demand for producing the position/time related data in this mode based on each subset of a number of candidate subsets of signal sources among the group of potential signal sources. Here, each candidate subset contains at least a minimum number of signal sources, which in said mode is required to produce the position/time related data of the desired quality. Hence, an accurate estimate can be made of the processing demand.

According to yet another preferred embodiment of the invention, each signal source is represented by a particular satellite of at least one global navigation satellite system. The group of potential signal sources here represents all satellites of the at least one global navigation satellite system, which are visible from a current position/time for the receiver. For instance, the group of potential signal sources may be determined from a so-called almanac and/or ephemeris function describing the satellites' movements over time. Moreover, various types of assisted GNSS solutions may provide equivalent or additional aiding information.

According to still another preferred embodiment of the invention, the processing unit is adapted to determine the candidate subset, which is associated with the lowest estimated processing demand during the subsequent period by optimizing a cost function expressing a processing intensity as a function of a data quality level with respect to the position/time related data. Hence, an optimal candidate set can be determined efficiently, for example by means of linear programming.

According to another aspect of the invention the object is achieved by the method described initially, involving the steps of: estimating a respective processing demand required to produce the position/time related data based on each subset of a number of candidate subsets of signal sources among the group of potential signal sources, each candidate subset containing at least a minimum number of signal sources necessary to produce the position/time related data of a desired quality, and selecting the set of preferred signal sources based on a candidate subset being associated with a lowest estimated processing demand during a subsequent operating period for the receiver.

The advantages of this method, as well as the preferred embodiments thereof, are apparent from the discussion above with reference to the proposed receiver.

According to a further aspect of the invention the object is achieved by a computer program product, which is directly loadable into the memory of a computer, and includes software for controlling the method proposed above when said program is run on a computer.

According to another aspect of the invention the object is achieved by a computer readable medium, having a program recorded thereon, where the program is to control a computer to perform the method proposed above.

Further advantages, beneficial features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED EMBODIMENTS OF THE INVENTION

Figure 1:
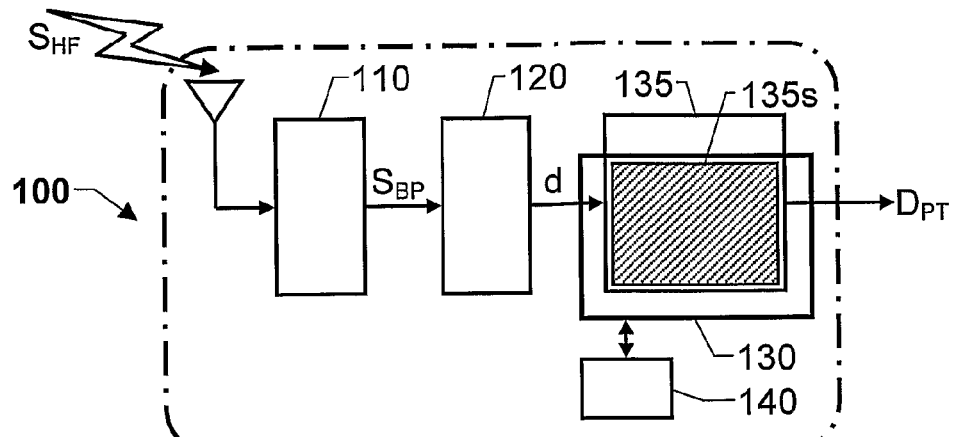
FIG. 1 shows a block diagram of a spread spectrum signal receiver according to one embodiment of the invention.

FIG. 1 shows a block diagram of a spread spectrum receiver 100 according to one embodiment of the invention. The receiver 100 includes a radio front-end unit 110, an interface unit 120 and a radio signal processing unit 135. The receiver 100 preferably also includes a computer readable medium 140, such as a memory buffer, storing a program which is adapted to control the processing unit 135 to operate according to the proposed principle.

The radio front-end unit 110, in turn, has an antenna means adapted to receive radio signals $S_{HF}$ from a plurality of signal sources, for example a set of satellites belonging to one or more GNSSs. Therefore, the antenna means is capable of receiving radio frequency signals in at least one frequency band, e.g. the L1-, L2- and/or L5-bands, i.e. having spectra ranging from 1563 MHz to 1587 MHz, 1215 MHz to 1240 MHz and 1155 MHz to 1197 MHz respectively. Specifically, the radio front-end unit 110 is adapted to perform sampling and digitizing of the received radio signals $S_{HF}$, and to produce a resulting digital representation $S_{BP}$, based on which the radio signal processing unit 135 can perform relevant further signal processing to generate position/time related data $D_{PT}$. For example, the unit 110 may directly sample a bandpass version of the radio signals $S_{HF}$, or the unit 110 may execute I/Q bandpass sampling, and thus frequency downconvert the received signals $S_{HF}$ to the baseband.

The interface unit 120 is adapted to interconnect the radio front-end unit 110 with the radio signal processing unit 135 by converting the digital representation $S_{BP}$ from the radio front-end unit 110 to a data format d being suitable for the radio signal processing unit 135.

The radio signal processing unit 135 is at least partly implemented in software 135s running on a processor 130. Preferably, the radio signal processing unit 135 is entirely implemented in the software 135s. However it is feasible that one or more separate units, e.g. realized in an FPGA (Field Programmable Gate Array) design or an ASIC, are adapted to perform at least one of the unit's 135 processing functions.

According to the invention, the processing unit 135 is adapted to select a set of preferred signal sources from which the spread spectrum signals $S_{HF}$ are received to form a basis for the position/time related data $D_{PT}$. To this aim, the processing unit 135 is adapted to estimate a respective processing demand required to produce the data $D_{PT}$ based on each subset of a number of candidate subsets of signal sources among a group of potential signal sources. The candidate subsets are defined such that each subset contains at least a minimum number of signal sources necessary to produce the position/time related data $D_{PT}$ of a desired quality. Naturally, the candidate subsets need not include all theoretically possible constellations of the potential signal sources. Preferably, any subsets that can immediately be deduced to represent highly unfavorable, or even non-working combinations, are discarded directly (i.e. without any actual estimation of the processing demand to produce the position/time related data based on the signals from these signal sources). The processing unit 135 is adapted to select the set of preferred signal sources based on a candidate subset, which is associated with a lowest estimated processing demand during a subsequent operating period for the receiver 100. In other words, the set of preferred signal sources is defined as the candidate subset which is estimated to require a smallest amount of processing to generate the data $D_{PT}$ of the desired quality. Further details regarding the proposed selection of signal sources will be discussed below with reference to FIGS. 3 and 4.

According to one preferred embodiment of the invention, we presume that at least two of the signal sources in the group of potential signal sources emit signals of mutually different signal formats. For example, a number of signal sources may be represented by Galileo satellites, and at least one signal source may be represented by a non-Galileo satellite, which thus may be a GPS, a QZSS satellite, or a geostationary signal source in the form of an EGNOS satellite.

Here, the processing unit 135 is adapted to estimate the processing demand by considering a respective computational complexity for processing signals of each of said formats, i.e. in the above example, the GPS format and the relevant other format(s) Galileo, GLONASS and/or QZSS. The specifications of the GPS and Galileo formats are such that, provided identical physical circumstances, a GPS signal requires somewhat less processing power in order to derive resulting position/time related data. In reality, however, a vast number of additional factors influence the estimated processing demand required to produce this data, such as a pseudorange error parameter estimation, a parameter indicating detected interference, signal source health/status (data specifying whether or not a specific signal source is presently available for use) and various geometry factors, which may be described in terms of DOP.

Figure 2:
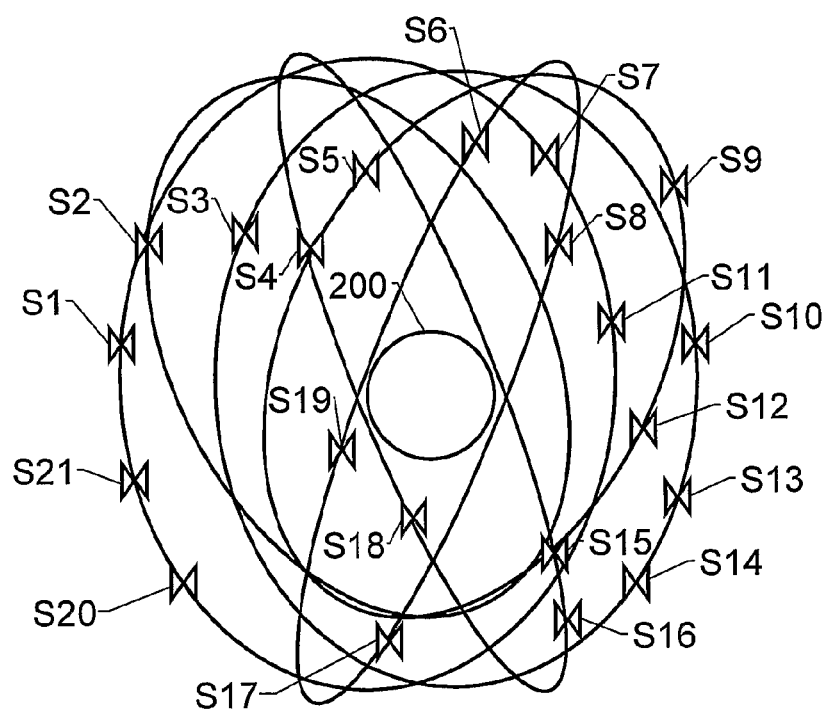
FIG. 2 illustrates how signal sources in the form of the satellites of a number of GNSSs orbit the Earth.

FIG. 2 schematically shows a number signal sources in the form of the satellites S1-S21 orbiting the Earth 200. The satellites may either all belong to a single GNSS, or they may belong to two or more different systems. For example, the satellites S1, S4, S7, S10, S13, S16 and S19 may be GPS satellites; while the satellites S2, S5, S8, S11, S14, S17 and S20 are Galileo satellites; and the satellites S3, S6, S9, S12, S15, S18 and S21 are GLONASS satellites. It is worth noting, however, that FIG. 2 is not representative because it is likely that the total number of GPS, GLONASS and Galileo satellites will be significantly larger than the number of satellites shown in this figure.

Figure 3:
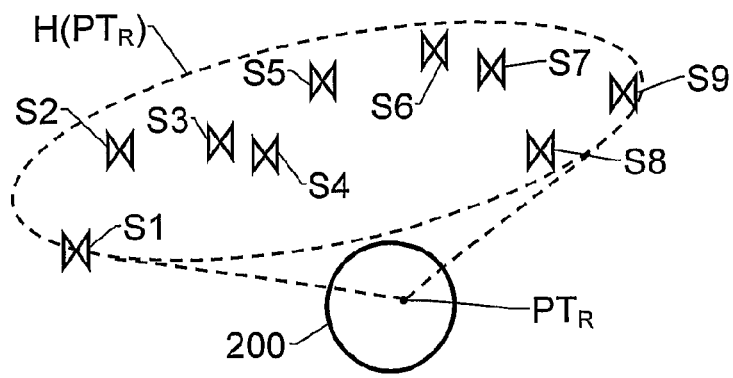
FIG. 3 illustrates a group of potential signal sources presently visible from a particular receiver position.

FIG. 3 illustrates a group of potential signal sources S1-S9 of the satellites shown in FIG. 2 that are visible from a particular receiver position at a particular instant, i.e. a given position/time $PT_R$. Here, a visibility limit $H(PT_R)$ is schematically specified as the horizon seen from the position/time $PT_R$. In reality, however, the receiver preferably applies an elevation mask angle, e.g. equivalent to 5° elevation above the horizon, i.a. to avoid large multipath errors.

As mentioned above, a tentative group of potential signal sources is preferably derived from an almanac function in the receiver. This function describes the satellites' movements over time. Alternatively, or as a complement thereto, said group may be derived from broadcast ephemeris data and/or an assisted GNSS service available to the receiver. Normally, the ephemeris data is associated with an issue of data ephemeris (IODE) parameter, which indicates how old the information is. Depending on the time span since a most recent update of the receiver's position and/or time references, the expected composition of the tentative group and the expected positions of each member in said group may be imperfect or incorrect.

Generally, somewhat more processing power is required to derive the position/time related data based on Galileo signals than based on GPS signals. However, if the IODE indicates a much more recent update of the Galileo satellites than of the GPS satellites, it may still be a good idea to focus the selection of the preferred set of signal sources on the Galileo satellites because here the knowledge of the tentative group can be expected to be more accurate. Of course, a full acquisition procedure in which signals are registered from all the actually available signal sources provides the most accurate characterization of the group of potential signal sources S1-S9, and could in principle be used to identify which subsets yield position/time data of the desired quality. Namely, one or more signal sources may malfunction, and/or the receiver may be located in a radio shadow with respect to one or more of the signal sources.

Nevertheless, provided the example GNSSs mentioned above, the group of potential signal sources S1-S9 includes three GPS satellites S1, S4 and S7, three Galileo satellites S2, S5 and S8 respective three GLONASS satellites S3, S6 and S9. Consequently, the signal sources in the group of potential signal sources S1-S9 emit signals of mutually different signal formats.

According to the invention, the processing unit 135 is adapted to estimate a respective processing demand required to produce the position/time related data $D_{PT}$ of a desired quality based on each subset of a number of candidate subsets of signal sources among the group of potential signal sources S1-S9. Due to the potentially different signal formats of the signal sources in the group of potential signal sources S1-S9, according to one preferred embodiment of the invention, the processing unit 135 is adapted to estimate the processing demand by considering a respective computational complexity for processing signals of each of the potential signal formats.

Figure 4:
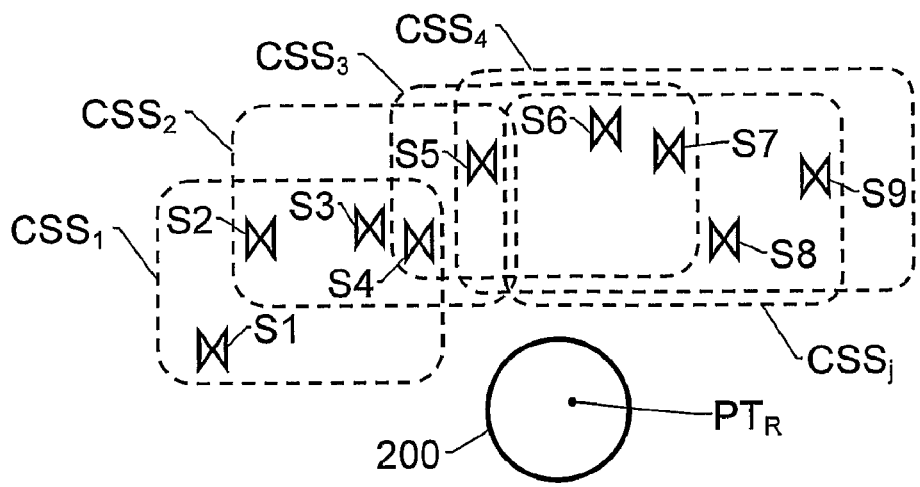
FIG. 4 illustrates how candidate subsets of signal sources may be defined in a group of potential signal sources according to one embodiment of the invention.

FIG. 4 shows a relatively small number of candidate subsets $CSS_1$-$CSS_j$, which may be defined from the group of potential signal sources S1-S9. In this example, for reasons of clarity, the candidate subsets $CSS_1$, $CSS_2$, $CSS_3$, $CSS_4$ and $CSS_j$ contain relatively few signal sources (four or five). Specifically, the candidate subset $CSS_1$ contains the signal sources S1, S2, S3 and S4; the candidate subset $CSS_2$ contains the signal sources S2, S3, S4 and S5; the candidate subset $CSS_3$ contains the signal sources S4, S5, S6 and S7; the candidate subset $CSS_4$ contains the signal sources S5, S6, S7, S8 and S9; and the candidate subset $CSS_j$ contains the signal sources S6, S7, S8 and S9. Normally, a set of four signal sources is the minimum number of signal sources necessary to produce a position estimate. Moreover, for reasons of clarity, the candidate subsets $CSS_1$-$CSS_j$ are here defined such that each set contains a group of signal sources being positioned relatively proximate to one another. In an actual case, any geometrical interrelationships between the signal sources and the receiver are possible, provided that the signal sources lie within the visibility limit $H(PT_R)$ from the receiver. Furthermore, according to the invention, each candidate subset $CSS_1$-$CSS_j$ contains at least a minimum number of signal sources, which is necessary to produce the position/time related data $D_{PT}$ of a desired quality. This means that, for certain types of timing measurements, as few as a single signal source may be sufficient, while for highly accurate positioning, 8, 12, or even more signal sources may be needed. Particularly in such a case, it is advantageous to utilize the satellite signals from more than one GNSS.

Based on the candidate subsets $CSS_1$-$CSS_j$, a set of preferred signal sources is selected, such that the selected set, say $CSS_3$, is the candidate subset that is associated with a lowest estimated processing demand to produce the position/time related data $D_{PT}$ of the desired quality. This estimation is assumed to be valid during a subsequent operating period for the receiver. The subsequent operating period is a future interval of any duration, for example represented by a number of processor clock cycles. In any case, the subsequent operating period may include any kind of receiver operation, such as acquisition, tracking or oscillator synchronization.

In order to attain a highly accurate estimate of the processing demand estimation of high accuracy, according one preferred embodiment of the invention, the processing unit 135 is adapted to estimate the processing demand by means of a procedure involving determining a respective signal quality of each signal in the group of potential signal sources S1-S9. The signal quality is reflected by a signal power estimation, a noise density estimation, which in turn, may be used to compute an estimate of the received signal-to-noise ratio.

Alternatively, or as a complement thereto, the signal quality may be reflected by a pseudorange error parameter estimation. This estimation, in turn, may include estimation of a parameter expressing multipath distortion, parameters indicating estimated atmospheric delays (i.e. delays introduced by the ionosphere and/or in the troposphere) and/or a parameter indicating any satellite-based signal distortions (i.e. signal non-idealities caused by problems in the satellite).

Alternatively, or as yet another complement, the signal quality may be reflected by a parameter indicating interference detection. For example, narrowband interference may be detected (which typically is an amount of undesired sinusoidal energy), wideband interference may be detected (which typically is an amount of white or colored noise energy), jamming signals may be detected and/or spoofing signals may be detected, i.e. signals intentionally transmitted to disturb or deceive the receiver. According to one preferred embodiment of the invention, the interference parameter has the following influence on the selection of signal sources in the preferred set. If a particular frequency band is found to be subjected to narrowband interference or jamming, signal sources from alternative frequency bands, if available, are preferably selected. A determination can then be made about whether or not it is possible to meet the position/time data quality requirements using the available sources within the existing constraint of processing intensity. If, on the other hand, broadband interference or jamming is detected, the procedure involves calculating how much more averaging will be necessary to obtain ranges of the desired quality, or if no attainable amount of averaging will be sufficient. The estimates of the required processing demand are then revised accordingly.

Alternatively, or as still another complement, the signal quality may be reflected by signal source health/status data indicating whether or not a specific signal source is presently available for use. Such data is typically included in messages being repeatedly transmitted from the signal sources. Analogously, said atmospheric parameters may be represented by the so-called Klobuchar parameters being included in similar messages likewise being originated by the signal sources.

According to another preferred embodiment of the invention, the processing unit 135 is adapted to estimate the processing demand by considering at least one geometry parameter, which reflects a spatial position of each of the signal sources in the group of potential signal sources S1-S9 relative to the receiver's current position/time $PT_R$. Various forms of DOP measures constitute examples of such geometry parameters, e.g. GDOP (Geometric DOP), PDOP (Position DOP), VDOP (Vertical DOP), HDOP (Horizontal DOP) and TDOP (Time DOP). Since the DOP depends on the specific geometric relationships between the satellites and the receiver, and therefore varies over time, signals would preferably be received from those satellites which yield the best DOP, all other factors being equal. This is equivalent to optimizing the selection of satellites such that a lowest possible DOP value is obtained. Naturally, however, this optimization only pertains to the DOP measure as such. In an actual case, numerous factors besides DOP also influence the quality of the position/time related data $D_{PT}$, and thus the processing demand for generating this data at a particular quality.

For efficient operation, according to one preferred embodiment of the invention, the processing unit 135 is adapted to estimate the candidate subset, say $CSS_3$ above, which is associated with the lowest processing demand during the subsequent period by optimizing a cost function. This function expresses a processing intensity as a function of a data quality level in respect of the position/time related data $D_{PT}$. For example, by applying linear programming (e.g. convex optimization), to the cost function, said candidate subset $CSS_3$ can be determined relatively quickly.

Provided that the processor 130 has adequate processing resources, it may be preferable to hold one or more channels in the processing unit 135 open to repeatedly evaluate the quality of at least one ranging signal source, or to perform said evaluation on one or more active channels from time to time. Thereby, whenever a set of signals sources including the evaluated source(s) is estimated to provide a better data quality per invested processor cycle than the currently selected subset, the selection of signals sources can be modified to include one or more of the evaluated sources, either as a complement to, or as a substitute for, all or some of the previously selected sources.

According to one preferred embodiment of the invention, the processing unit 135 is adapted to estimate the processing demand by considering whether a future operational mode of the receiver 100, i.e. during the subsequent operating period, is expected to be identical to a current operational mode of the receiver 100. The operational modes may include a first mode in which real-time navigation is provided (here, the receiver preferably produces position updates as often as technically possible); a second mode in which the data $D_{PT}$ is produced exclusively in response to specific user requests, so-called single-point fixes; a third low-power mode in which only accurate time is needed (i.e. the data $D_{PT}$ only includes time, and therefore it is sufficient to track a single satellite, and perhaps receive signals only once every tens of minutes to hours depending on the quality of the receiver's oscillator); and a fourth mode in which the data $D_{PT}$ is updated at a user-specified rate, which can be anything from the rate of the first mode to the rate of the third mode. Naturally, for a given data quality, each of these modes has an average processing demand per unit time that typically is different from the other modes. Therefore, if the future operational mode is expected to be different from the current operational mode, the processing unit 135 is preferably adapted to estimate a respective processing demand for producing the position/time related data $D_{PT}$ in the future operational mode instead of the current operational mode. In this case, the processing-demand estimation is still based on each subset of a number of candidate subsets of signal sources among the group of potential signal sources, such as S1-S9 above. Moreover, each candidate subset contains at least a minimum number of signal sources, which is required to produce the position/time related data $D_{PT}$ in the future operational mode.

Figure 5:
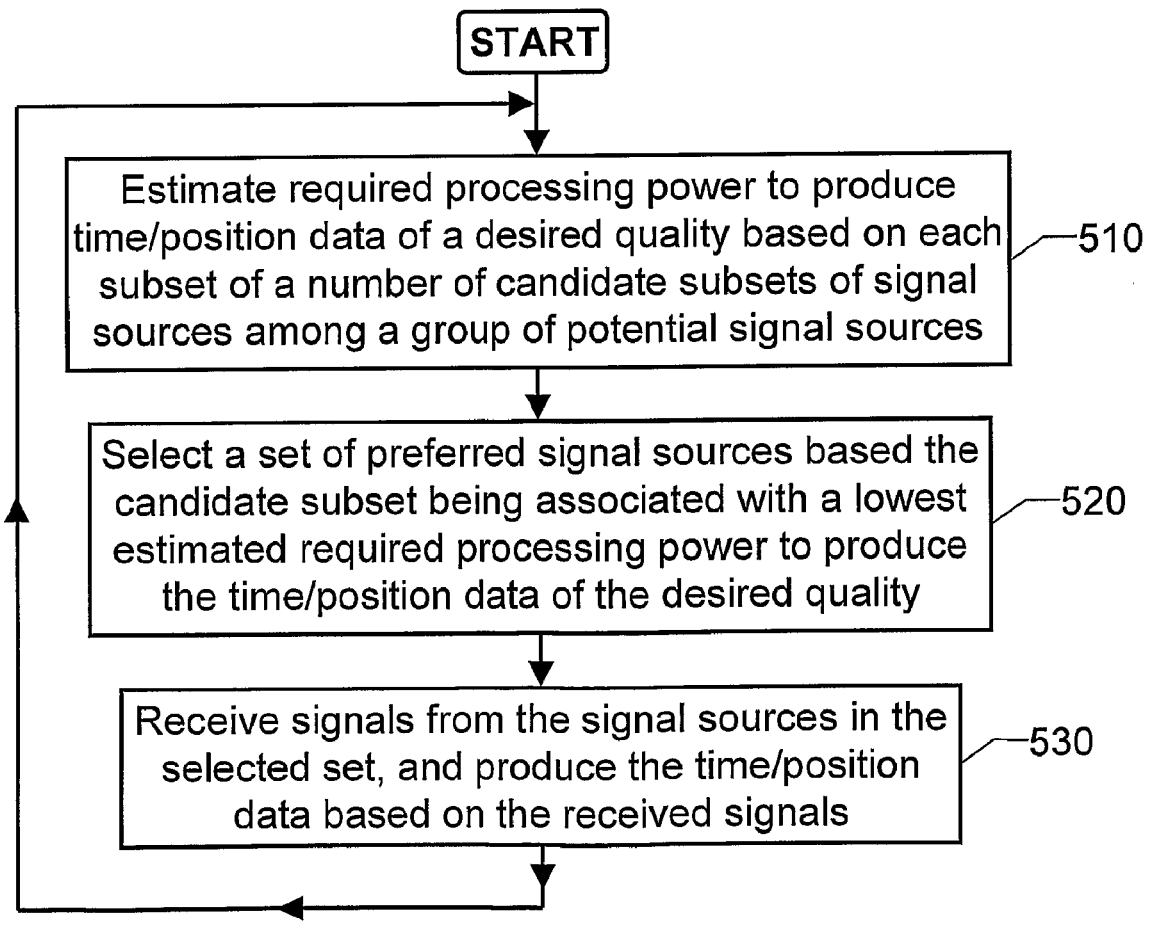
FIG. 5 illustrates, by means of a flow diagram, the general method of operating a spread spectrum receiver according to the invention.

To sum up, we will now describe the general method of controlling a spread spectrum signal receiver according to the invention with reference to the flow diagram in FIG. 5.

An initial step 510 estimates a respective processing demand that is required to produce position/time related data based on each subset of a number of candidate subsets of signal sources among a group of potential signal sources. Each of the candidate subsets contains at least a minimum number of signal sources necessary to produce the position/time related data of a desired quality. Hence, the number of candidate subsets is normally relatively large. However, determining the candidate sub-set that is associated with the lowest estimated processing demand during a subsequent operating period requires a comparatively small amount of processing resources. Therefore, by optimizing the selection of signal sources, the overall usage of the processing unit's processing resources can be economized.

A subsequent step 520 selects a set of preferred signal sources, i.e. the subset, which in the step 510 was found to be associated with the lowest estimated processing demand for producing the position/time data of the desired quality.

Then, a step 530 receives spread spectrum signals from the signal sources in the selected set. This reception continues during said operating period. Depending on the implementation and the receiver's current operational mode, the length of this period may vary from a few processor clock cycles to several minutes. Moreover, it is worth noting that the above-mentioned lowest estimated processing demand for producing the position/time data of a desired quality refers to the expected total amount of processing necessary to perform during said operating period. Thus, an initial processing peak may be acceptable provided that this peak is comparatively short, and the expected total amount of processing becomes sufficiently low during subsequent operations.

All of the steps, as well as any sub-sequence of steps, described with reference to FIG. 5 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the procedure according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc), an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant procedures.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia.

The invention is not restricted to the described embodiments in the figures, but may be varied freely within the scope of the claims.

The invention claimed is:

1. A spread spectrum signal receiver comprising:
a radio signal processing unit at least partly implemented in software running on a processor, the processing unit being adapted to select a set of preferred signal sources from a group of potential signal sources, receive spread spectrum signals from the selected set of signal sources, and based on the received signals produce position/time related data,
wherein the processing unit is configured to:
estimate for each subset of a number of candidate subsets of signal sources among the group of potential signal sources a respective processing demand required to produce the position/time related data based on the subset of signal sources, each candidate subset of signal sources containing at least a minimum number of signal sources necessary to produce the position/time related data of a desired quality, and
select the set of preferred signal sources based on a candidate subset being associated with a lowest estimated processing demand during a subsequent operating period for the receiver.

2. The receiver according to claim 1, wherein at least two of the signal sources in the group of potential signal sources emit signals of mutually different signal formats, and the processing unit is configured to estimate the processing demand by considering a respective computational complexity for processing signals of each of said signal formats.

3. The receiver according to claim 1, wherein the processing unit is configured to estimate the processing demand by determining a respective signal quality of each signal in the group of potential signal sources, the signal quality being reflected by at least one of:
a signal power parameter estimation,
a noise density parameter estimation,
a pseudorange error parameter estimation,
a parameter indicating interference detection, and
signal source health/status data.

4. The receiver according to claim 1, wherein the processing unit is configured to estimate the processing demand by considering at least one geometry parameter reflecting a spatial position of each of the signal sources in the group of potential signal sources relative to a current position/time for the receiver.

5. The receiver according to claim 1, wherein the processing unit is configured to estimate the processing demand by considering whether a future operational mode of the receiver during the subsequent operating period is expected to be identical to a current operational mode of the receiver.

6. The receiver according to claim 5, wherein if the future operational mode is different from the current operational mode, the processing unit is configured to estimate a respective processing demand for producing the position/time related data in the future operational mode based on each subset of a number of candidate subsets of signal sources among the group of potential signal sources, and each candidate subset contains at least a minimum number of signal sources required to produce the position/time related data of the desired quality in the future operational mode.

7. The receiver according to claim 1, wherein each signal source is represented by a particular satellite of at least one global navigation satellite system, and the group of potential signal sources represents all satellites of the at least one global navigation satellite system being visible from a current position/time for the receiver.

8. The receiver according to claim 1, wherein the processing unit is configured to estimate the candidate subset which is associated with the lowest processing demand during the subsequent period by optimizing a cost function expressing a processing intensity as a function of a data quality level in respect of the position/time related data.

9. A method of operating a spread spectrum signal receiver, comprising a radio signal processing unit being at least partly implemented in software running on a processor, the method comprising:
selecting a set of preferred signal sources from a group of potential signal sources,
receiving spread spectrum signals from the selected set of signal sources,
producing position/time related data based on the received signals,
estimating for each subset of a number of candidate subsets of signal sources among the group of potential signal sources a respective processing demand required to produce the position/time related data based on the subset of signal sources, each candidate subset of signal sources containing at least a minimum number of signal sources necessary to produce the position/time related data of a desired quality, and
selecting the set of preferred signal sources based on a candidate subset being associated with a lowest estimated processing demand during a subsequent operating period for the receiver.

10. The method according to claim 9, wherein at least two of the signal sources in the group of potential signal sources emitting signals of mutually different signal formats, and wherein estimating the processing demand comprises considering a respective computational complexity for processing signals of each of said signal formats.

11. The method according to claim 9, wherein estimating the respective processing demands comprises considering a respective estimated signal quality of each signal in the group of potential signal sources, using at least one of:
a signal power parameter estimation,
a noise density parameter estimation,
a pseudorange error parameter estimation,
a parameter indicating interference detection, and
signal source health/status data.

12. The method according to claim 9, wherein estimating the processing demand comprises considering at least one geometry parameter reflecting a spatial position of each of the signal sources in the group of potential signal sources relative to a current position/time for the receiver.

13. The method according to claim 9, wherein estimating the processing demand comprises considering whether a future operational mode of the receiver during the subsequent operating period is expected to be identical to a current operational mode of the receiver.

14. The method according to claim 13, wherein when the future operational mode is different from the current operational mode, the method further comprises:
estimating a respective processing demand for producing the position/time related data in the future operational mode based on each subset of a number of candidate subsets of signal sources among the group of potential signal sources, each candidate subset containing at least a minimum number of signal sources required to produce the position/time related data of the desired quality in the future operational mode.

15. The method according to claim 9, wherein selecting a set of preferred signal sources from a group of potential signal sources comprises selecting a signal source from a global navigation system wherein each signal source is represented by a particular satellite of at least one global navigation satellite system, and the group of potential signal sources representing all satellites of the at least one global navigation satellite system being visible from a current position/time for the receiver.

16. The method according to claim 9, wherein estimating the processing demand comprises estimating the candidate subset which is associated with the lowest processing demand during the subsequent period by optimizing a cost function expressing a processing intensity as a function of a data quality level in respect of the position/time related data.

17. A computer program product directly loadable into the memory of a computer, comprising computer-readable program code portions comprising:

- an executable portion configured for selecting a set of preferred signal sources from a group of potential signal sources,
- an executable portion configured for receiving spread spectrum signals from the selected set of signal sources,
- an executable portion configured for producing position/time related data based on the received signals,
- an executable portion configured for estimating for each subset of a number of candidate subsets of signal sources among the group of potential signal sources a respective processing demand required to produce the position/time related data based on the subset of signal sources, each candidate subset of signal sources containing at least a minimum number of signal sources necessary to produce the position/time related data of a desired quality, and
- an executable portion configured for selecting the set of preferred signal sources based on a candidate subset being associated with a lowest estimated processing demand during a subsequent operating period for the receiver.

18. A computer readable medium, having a program recorded thereon, where the program comprising computer-readable program code portions comprising:

- an executable portion configured for selecting a set of preferred signal sources from a group of potential signal sources,
- an executable portion configured for receiving spread spectrum signals from the selected set of signal sources,
- an executable portion configured for producing position/time related data based on the received signals,
- an executable portion configured for estimating for each subset of a number of candidate subsets of signal sources among the group of potential signal sources a respective processing demand required to produce the position/time related data based on the subset of signal sources, each candidate subset of signal sources containing at least a minimum number of signal sources necessary to produce the position/time related data of a desired quality, and
- an executable portion configured for selecting the set of preferred signal sources based on a candidate subset being associated with a lowest estimated processing demand during a subsequent operating period for the receiver.

* * * * *